United States Patent [19]

Takahashi

[11] Patent Number: 4,458,550
[45] Date of Patent: Jul. 10, 1984

[54] REVERSE GEAR SELECTOR MECHANISM IN TRANSMISSION

[75] Inventor: Kotei Takahashi, Yokohama, Japan

[73] Assignee: Nisson Motor Co., Ltd., Yokohama, Japan

[21] Appl. No.: 350,383

[22] Filed: Feb. 19, 1982

[30] Foreign Application Priority Data

Feb. 20, 1981 [JP] Japan .................................. 56-22891

[51] Int. Cl.$^3$ ............................................. G05G 9/12
[52] U.S. Cl. .................................... 74/473 R; 74/475; 200/61.91
[58] Field of Search .................... 74/473 R, 475, 476, 74/477; 200/61.91

[56] References Cited

U.S. PATENT DOCUMENTS

| 3,731,554 | 5/1973 | Renk | 74/477 |
| 4,174,644 | 11/1979 | Nagy et al. | 74/475 X |
| 4,301,692 | 11/1981 | Frazee | 74/476 |
| 4,307,624 | 12/1981 | Mylenek | 74/477 |
| 4,377,093 | 3/1983 | Janson | 74/473 R X |

FOREIGN PATENT DOCUMENTS 48-19691  6/1973  Japan .
1274334  5/1972  United Kingdom .

Primary Examiner—Allan D. Herrmann
Attorney, Agent, or Firm—Lowe, King, Price & Becker

[57] ABSTRACT

A reverse gear selector mechanism in an automotive manual transmission comprises a reverse shifter operable to directly move a reverse idler gear into predetermined shift positions when rotated by a striking lever about a pivot shaft. The reverse shifter is T-shaped in plan with a notch engaging the striking lever and a forked end straddling the reverse idler gear.

3 Claims, 8 Drawing Figures

FIG.4 A  FIG.4 B
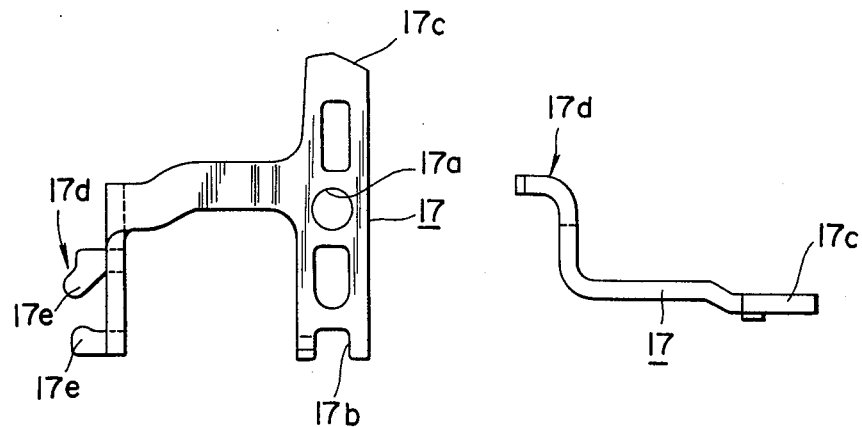
FIG.5
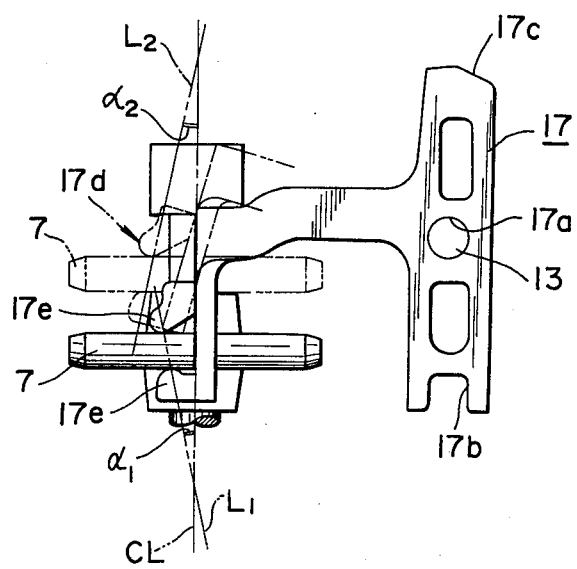

REVERSE GEAR SELECTOR MECHANISM IN TRANSMISSION

BACKGROUND OF THE INVENTION

1. Field of the Invention

The present invention relates to a gear selector mechanism, particularly a reverse gear selector mechanism in an automotive manual transmission suited for adoption to a transverse front engine-front wheel drive system or a transverse rear engine-rear wheel drive system.

2. Description of the Prior Art

A typical gear selector mechanism of the above described kind is disclosed in the Japanese Utility Model Publication No. 48-19691. The mechanism is constructed to be able to effect both forward gear selection and reverse gear selection by rotating and axially displacing a striking rod having fixedly mounted thereon a striking lever and allowing the movement of the striking lever to be transmitted through selected one of shifters and a shift fork coupled with the selected shifter to one of coupling sleeves for selection of forward gear or to a reverse idler gear for selection of reverse gear.

SUMMARY OF THE INVENTION

In accordance with the present invention, there is provided a novel and improved reverse gear selector mechanism in a transmission. The transmission has a case and a reverse idler gear movable on an idler shaft between first and second shift positions.

The reverse gear selector mechanism comprises a striking rod rotatably and movably mounted to the transmission case, a striking lever fixedly mounted on the striking rod and having a finger, and a reverse shifter pivotally mounted on a pivot shaft arranged stationary relative to the transmission case. The reverse shifter has a first end formed with a notch with which the finger of the striking lever is selectively engageable to cause the reverse shifter to rotate about the pivot shaft when the striking rod is axially moved. The reverse shifter also has a forked, second end straddling part of the circumference of the reverse idler gear. The forked, second end of the reverse shifter has a pair of forked end fingers holding therebetween the reverse idler gear so that the reverse shifter is operative to directly move the reverse idler gear into the first and second shift positions when the reverse shifter is rotated about the pivot shaft.

The above structure dispenses with the reverse shift fork, the fork shaft for the reverse shift fork, the annular groove portion of the reverse idler gear and so on, to provide assured and accurate control of the reverse idler gear shift position as well as to attain reduction in the number of constituent parts and a simplified structure.

It is accordingly an object of the present invention to provide a novel and improved reverse gear selector mechanism which is enabled to provide assured control of the reverse idler gear shift position as well as to attain reduction in the number of constituent parts and a simplified structure.

BRIEF DESCRIPTION OF THE DRAWINGS

The features and advantages of the reverse gear selector mechanism according to the present invention will become more clearly appreciated from the following description taken in conjunction with the accompanying drawings, in which:

FIG. 4A is a reverse shifter utilized in the shifter assembly of FIG. 3A;

FIG. 4B is a top plan view of the reverse shifter of FIG. 4A; and

FIG. 5 is a view of the reverse shifter of FIG. 3A together with a cooperating reverse idler gear and shows their rest or reverse gear release positions by solid line and their working or reverse gear selection positions by two-dot chain line, respectively.

DESCRIPTION OF THE PREFERRED EMBODIMENT

Figure 1:
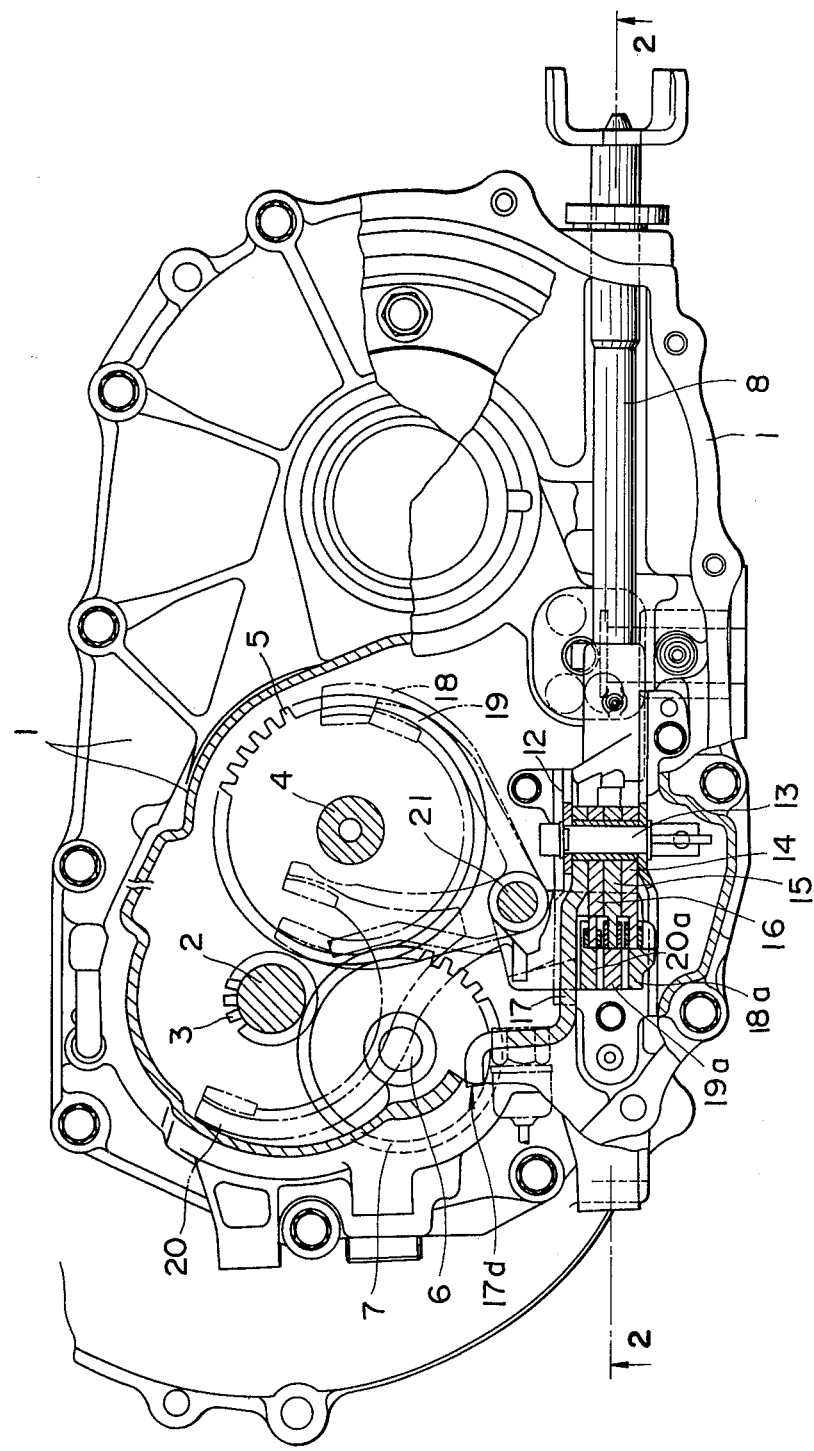
FIG. 1 is a vertical section of a transmission incorporating the present invention.

Referring to FIGS. 1 to 5, inclusive, an automotive manual transmission for a transverse front engine-front wheel drive system is shown as comprising a transmission case 1 and an input shaft 2 connected to an engine crankshaft (not shown via a clutch (also not shown). The input shaft 2 has mounted thereon a reverse input gear 3 which is integrally formed therewith. The transmission further comprises a main shaft 4 drivingly connected to front wheel axles (not shown) via a final drive assembly (also not shown). The main shaft 4 has mounted thereon a reverse main gear 5 and is drivingly connected with same. Indicated by the reference numeral 6 is an idler shaft on which a reverse idler gear 7 is rotatably mounted.

A gear selector mechanism for the transmission is structured as follows. To the transmission case 1, a striking rod 8 is rotatably and axially movably mounted, whilst on the other hand to the striking rod 8, a striking lever 9 having a finger 9a is fixedly attached with a split pin 10 to move together therewith. The striking rod 8 has suitably spaced notches 8a engageable with a spring-loaded detent or shift check ball 11 which holds the striking rod 8 at the predetermined position to which it has been shifted. Indicated by the reference numeral 12 is a shifter bracket fixedly attached to the transmission case 1. The shifter bracket 12 has opposite side flanges between which there are placed bell crank-shaped shifters 14, 15 and 16 and another shifter 17 arranged to lie one above another. The shifters are pivotally mounted on the flanges with a shifter pivot shaft 13. Of the shifters, 14, 15 and 16 are forward shifters for selection of forward gears and 17 is a reverse shifter for selection of reverse gear. The shifter bracket, shifters and shifter pivot pin constitute a shifter assembly as a unit as best shown in FIGS. 3A, 3B and 3C.

The shifters 14, 15 and 16 are operatively connected to shift forks 18, 19 and 20 for selection of forward gears, respectively. The shift forks are made of aluminium and movably mounted on a fork shaft 21 which in turn is attached to the transmission case 1. The ends 18a, 19a and 20a of the shift forks 18, 19 and 20 opposite to the forked ends thereof are respectively formed with notches 18b, 19b and 20b in which the ends 14a, 15a and 16a of the shifters 14, 15 and 16 are received. Each of the shifter ends has fitted thereon a shifter cap 23 made of a suitable material such as a sintered alloy or a synthetic resinous material. The ends of the shifters 14, 15 and 16 opposite to the ends engaging the shift forks 18, 19 and 20 are formed with notches 14b, 15b and 16b for receiving therein the finger 9a of the striking lever 9 in such a manner that the finger is selectively engageable with one of the shifters.

In addition to the above structure, the following is further made in accordance with the present invention. As best shown in FIGS. 4A and 4B, the reverse shifter 17 is formed into a T-like shape having a transverse arm and a longitudinal leg. The reverse shifter has a hole 17a at a location substantially corresponding to the intermediate part of the transverse arm of the T-shape and also has a notch 17b at a location corresponding to an end of the transverse arm and a cam 17c at a location corresponding to the other end of the transverse arm. Similarly to the notches 14b, 15b and 16b of the shifters 14, 15 and 16, the shifter 17 is adapted to selectively engage at the notch 17b with the finger 9a of the striking lever 9 for selection of reverse gear. The portion of the reverse shifter 17 corresponding to the longitudinal leg of the T-shape is extended to terminate at a forked end 17d having a pair of forked end fingers 17e and 17e. The forked end 17d is so constructed and arranged to partly straddle the circumference of the reverse idler gear 7 and engage at the fingers 17e and 17e thereof with the opposite side surfaces of the reverse idler gear 7. That is, the forked end fingers 17e and 17e are placed at the respective sides of the reverse idler gear 7 to hold therebetween the reverse idler gear. With this structure, the reverse shifter 17 is adapted to be able to directly move the reverse idler gear 7 along the axis of the reverse idler shaft 6 when rotated about the shifter pivot shaft 13 in a predetermined direction. In this instance, the shape of the forked end 17d is determined so that $\alpha_1 = \alpha_2$ with respect to a plan view as shown in FIG. 5, in which $\alpha_1$ is the angle formed by the center axis of CL of the reverse idler gear 7 and the straight line $L_1$ connecting the points of contact of the forked end 17d with the respective side surfaces of the reverse idler gear 7 at its rest or reverse gear release position shown by solid line in the drawing, and in which $\alpha_2$ is the angle formed by the center axis CL of the reverse idler gear 7 and the straight line $L_2$ connecting the points of contact of the forked end 17d with the respective side surfaces of the reverse idler gear 7 at its working or reverse gear selection position shown by two-dot chain line in the drawing. With this structure, the reverse shifter 17 can move the reverse idler gear 7 between the reverse gear selection and release positions without causing any play between the forked end and the reverse gear. The reverse idler gear 7 therefore can assume its rest and working positions assuredly and quite accurately.

Figure 2:
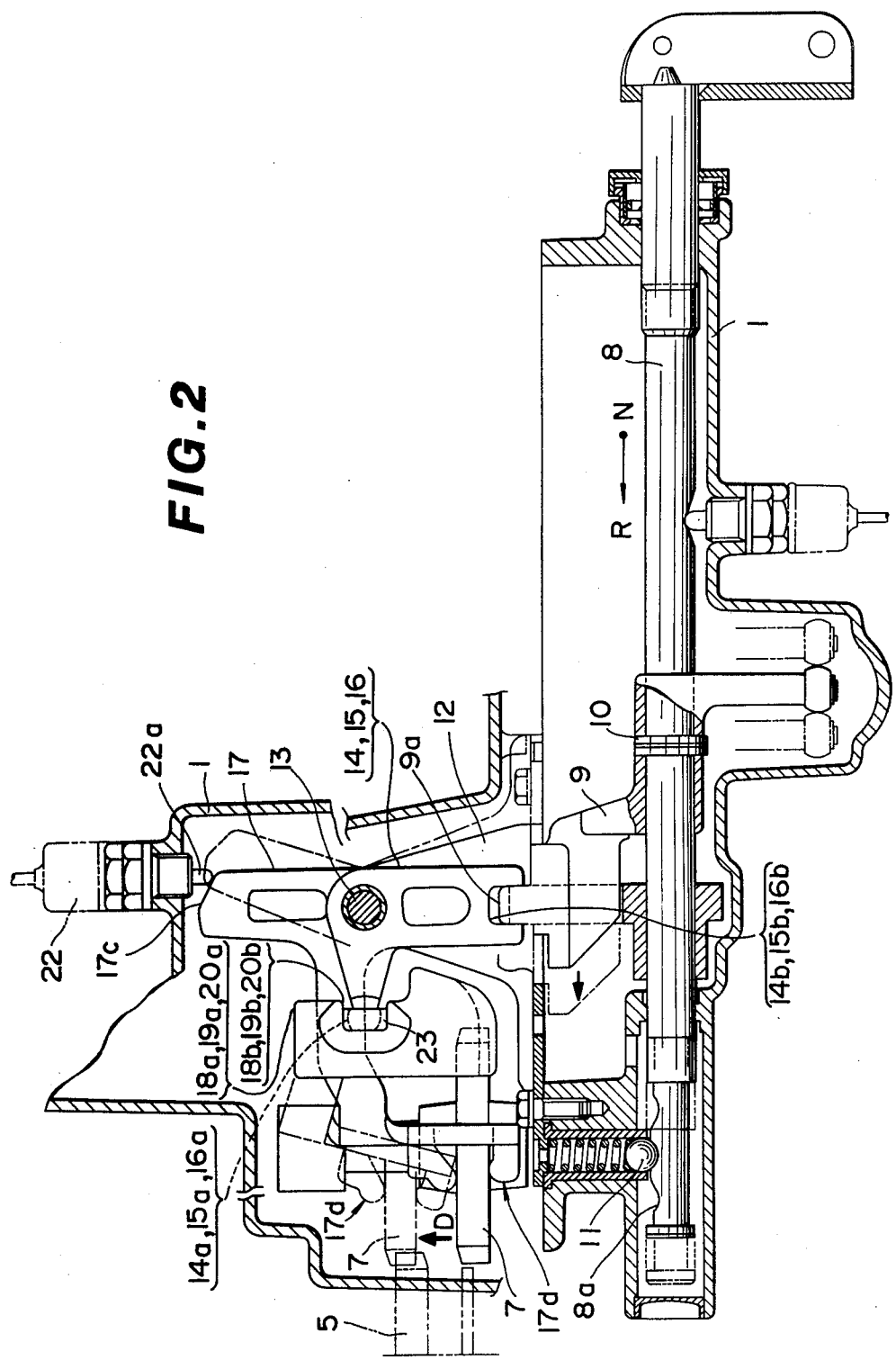
FIG. 2 is a section taken along the line 2—2 of FIG. 1.
Figure 3:
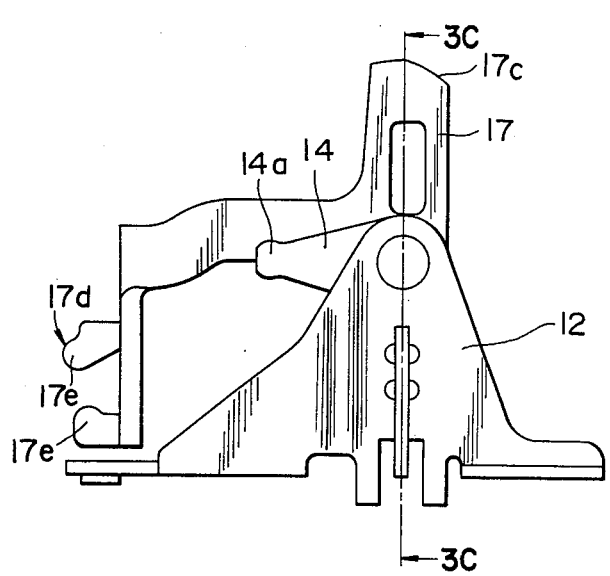
FIG. 3A is a front elevation of a shifter assembly utilized in the transmission of FIG. 1.
FIG. 3B is a top plan view of the shifter assembly of FIG. 3A.
FIG. 3C is a section taken along the line 3C—3C of FIG. 3A.
Figure 3:
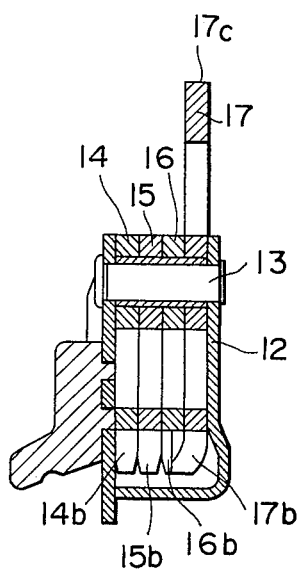
Figure 3:
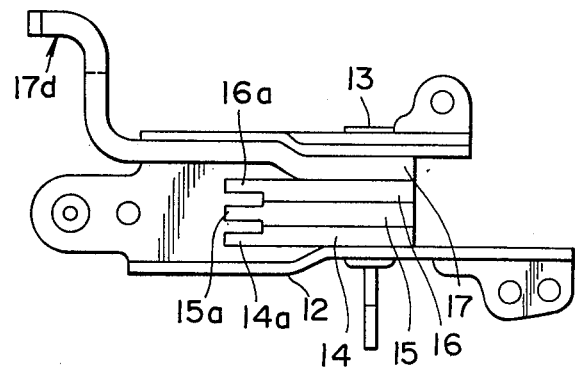

As shown in FIG. 2, the transmission is preferably provided with a reverse indicator switch 22 which is mounted to the transmission case 1 in such a manner that its contact 22a is placed to cooperate with the cam 17c of the reverse idler gear 7. With this structure, a lamp or buzzer (not shown) can be used and operated by the switch 22 to indicate the reverse gear selection.

The operation of the gear selector mechanism will now be described.

Upon forward gear selection, the striking rod 8 is first rotated to allow the fingers 9a of the striking lever 9 to be brought into engagement with one of the notches 14b, 15b and 16b of the shifters 14, 15 and 16. Then, the striking rod 8 is axially moved to cause the selected shifter to rotate in a predetermined direction about the shifter pivot shaft 13. The shift fork coupled with the selected shifter is thus displaced axially of the fork shaft 21 with the result that the corresponding coupling sleeve (not shown) is displaced to give the desired forward gear.

Upon reverse gear selection, the striking rod 8 is first rotated to allow the finger 9a of the striking lever 9 to be brought into engagement with the notch 17b of the shifter 17. Then, the striking rod 8 is axially moved in the direction of the arrow (R) from the position (N) in FIG. 2, causing the shifter 17 to rotate clockwise from the position shown by solid line in FIG. 2. For this sake, the reverse idler gear 7 held between the forked end fingers 17e and 17e of the shifter 17 is displaced from the position shown by solid line in FIG. 2 in the direction of the arrow (D) to the position shown by two-dot chain line where it is put into engagement with the reverse main gear 5 and the reverse input gear 3 integrally formed with the input shaft 2.

As a result, the power of the engine (not shown) is transferred in sequence through the reverse input gear 3, the reverse idler gear 7 and the reverse main gear 5 to the front wheel axles, thus enabling the vehicle to move backwardly.

In the foregoing, it is to be noted that the reverse shifter is operative to directly move the reverse idler gear. For this sake, the reverse shift fork and the fork shaft for the reverse shift fork which have been indispensable in the prior art mechanism of the comparable kind become unnecessary. Furthermore, it becomes unnecessary for the reverse idler gear to have an annular groove portion for engagement with a reverse shift fork. It is therefore to be understood that the present invention enables to provide assured and accurate control of the reverse idler gear shift position as well as to reduce the number of constituent parts and simplify the structure.

Further, when $\alpha_1 = \alpha_2$ is set as shown in FIG. 5, the reverse shifter is enabled to control the reverse gear selection and release positions of the reverse idler gear more accurately.

Still furthermore, when the shifter 17 is formed with the cam 17c, the reverse indication switch 22 becomes available to indicate the reverse gear selection, which is quite desirable.

Obviously, many variations and modifications of the present invention are possible in light of the above teachings. It is, therefore, to be understood that within the scope of the appended claims, the invention may be practiced otherwise than as specifically described.

What is claimed is:

1. A reverse gear selector mechanism in a transmission having a case and a reverse idler gear movable on an idler shaft between first and second shift positions, the reverse gear selector mechanism comprising:

a striking rod rotatably and mobably mounted to said transmission case;

a striking lever fixedly mounted on said striking rod and having a finger; and a reverse shifter pivotally mounted on a pivot shaft arranged stationary relative to said transmission case, said reverse shifter having a first end formed with a notch with which the finger of said striking lever is selectively engageable to cause the reverse shifter to rotate about said pivot shaft when said striking rod is axially moved and also having a forked, second end straddling part of the circumference of said reverse idler gear, said forked, second end having a pair of forked end fingers holding therebetween the reverse idler gear so that the reverse shifter is operative to directly move the reverse idler gear into said first and second shift positions when rotated about said pivot shaft; said reverse shifter being generally of T-shape in plan and having a longitudinal leg and a transverse arm at one end of said longitudinal leg, and in which said reverse shifter has said notch at a location corresponding to an end of said transverse arm and also has said forked end at a location corresponding to a free end of said longitudinal leg.

2. A reverse gear selector mechanism as set forth in claim 1, wherein, said reverse shifter further has a cam at a location corresponding to the other end of said transverse arm, which cam is operative to control a reverse indicator switch.

3. A reverse gear selector mechanism as set forth in claim 2, wherein said reverse shifter further has a hole at a location substantially corresponding to the intermediate part of said transverse arm and is pivotally mounted at said hole on said pivot shaft.

* * * * *